United States Patent [19]

Okamoto et al.

[11] 4,275,919
[45] Jun. 30, 1981

[54] SUSPENSION-TYPE HEAD LINING ARRANGEMENT FOR AUTOMOTIVE VEHICLE AND CLIP ELEMENT FOR USE THEREIN

[75] Inventors: Shoji Okamoto; Norio Kazama, both of Yokohama, Japan

[73] Assignee: Nissan Motor Company, Limited, Yokohama, Japan

[21] Appl. No.: 117,192

[22] Filed: Jan. 31, 1980

[30] Foreign Application Priority Data

Feb. 6, 1979 [JP] Japan ................................. 54-13396

[51] Int. Cl.³ ............................................. B62D 25/06
[52] U.S. Cl. ..................................... 296/214; 24/295; 52/718
[58] Field of Search .......... 296/214; 24/73 MF, 73 B, 24/73 BC, 73 PM, 81 BM; 52/718, 208

[56] References Cited

U.S. PATENT DOCUMENTS

| 2,837,184 | 6/1958 | Fernberg | 52/718 |
| 3,065,022 | 11/1962 | Schutle | 296/214 |
| 3,294,436 | 12/1966 | Bull | 296/214 |

*Primary Examiner*—Robert R. Song

[57] ABSTRACT

In a suspension-type head lining arrangement for the roof structure of an automotive vehicle, the head lining retained to the side frames of the vehicle body has fitted to each of its side edge portions an anchor wire retained to clip wires each of which is retained to lower edge portions of each of the side frames and which is held in retaining engagement with both of the anchor wire and a side molding having the clip elements enclosed therewithin.

22 Claims, 7 Drawing Figures

SUSPENSION-TYPE HEAD LINING ARRANGEMENT FOR AUTOMOTIVE VEHICLE AND CLIP ELEMENT FOR USE THEREIN

FIELD OF THE INVENTION

The present invention relates to head lining arrangements for the roof structures of automotive vehicles and, particularly, to a suspension-type head lining arrangement for the roof structure of an automotive vehicle. The present invention is further concerned with a clip element for use in a suspension-type head lining arrangement for the roof structure of an automotive vehicle.

BACKGROUND OF THE INVENTION

As is well known in the art, a suspension-type head lining arrangement for the roof structure of an automotive vehicle comprises a head lining having a laterally intermediate portion retained to and stretched between the side frames of the vehicle body by means of a plurality of listing wires which are hitched at their opposite ends to the side frames. An anchor wire is wrapped in each of the side edge portions of the head lining and is retained to each side frame by means of a plurality of wire retaining clip elements fitted to the side frames. The individual wire retaining clip elements are enclosed within a side molding extending along each of the side frames. The side molding is in turn fitted to the side frame by means of molding retaining clip elements which are arranged adjacent the wire retaining clip elements along the side molding.

One of the drawbacks encountered in a prior-art suspension-type head lining arrangement of the above described nature is that a disproportionately large number of steps are necessitated for assembling the head lining to the side frames of the vehicle body by the use of the clip elements for retaining the another wires in the lining to the side frames and the clip elements for retaining the side moldings to the frames. This is because of the fact that the two kinds of clip elements are constructed and arranged separately so that a doubled number of steps are required for fitting the wire retaining clip elements to the anchor wires and the molding retaining clip elements to the side frames of the vehicle body. The present invention contemplates elimination of this drawback inherent in conventional suspension-type head lining arrangements for the roof structures of automotive vehicle.

It is accordingly an object of the present invention to provide a novel clip element for use in a suspension-type head lining arrangement for the roof structure of an automotive vehicle. The clip element provided by the present invention is characterized, inter alia, in that the clip element is capable of achieving the respective functions of both of the wire retaining clip element and the molding retaining clip element which have been in use in a conventional suspension-type head lining arrangement.

It is another object of the present invention to provide a suspension-type head lining arrangement using such novel clip elements.

SUMMARY OF THE INVENTION

In accordance with one outstanding aspect of the present invention, there is provided a clip element for use in a suspension type head lining arrangement for the roof structure of an automotive vehicle, comprising a laterally elongate base portion, at least one strip portion bent from the base portion along one elongate end of the base portion, a limb bent from the base portion along the aforesaid elongate end of the base portion and having a cusped leading end portion which is turned back outwardly, and a flank bent from the base portion along the other elongate end of the base portion and having at least one lug portion which is outwardly bent from the flank. The flank of the clip element thus configured basically may further has at least one ledge portion which is inwardly bent from the flank.

In accordance with another outstanding aspect of the present invention, there is provided a clip element for use in a suspension-type head lining for the roof structure of an automotive vehicle, comprising a laterally elongate base portion, a pair of side strip portions which are bent from the base portion along one elongate end of the base portion and which extend substantially in parallel with each other, an intermediate limb laterally intervening between the side strip portions and bent from the base portion along the aforesaid elongate end of the base portion, the limb having a cusped leading end portion which is turned back outwardly, and a flank which is bent from the base portion along the other elongate end of the base portion and which has a pair of lug portions which are outwardly bent from adjacent portions of the flank. The flank of the clip element thus configured may further has a pair of ledge portions which are inwardly bent from adjacent portions of the flank.

In accordance with still another outstanding aspect of the present invention, there is provided a suspension-type head lining arrangement for the roof structure of an automotive vehicle having a vehicle body including a pair of side frames each having lower edge portions which are secured together and which extend along each side end of the roof structure, comprising a plurality of listing wires stretched between the side frames of the vehicle body and spaced apart substantially in parallel with each other in a fore-and-aft direction of the vehicle body, a head lining having a laterally intermediate portion retained to the listing wires, a pair of anchor wires retained to the head lining along the side ends, respectively, of the head lining, a plurality of clip elements which are fitted to the aforesaid edge portions of each of the side frames, and a side molding which is fitted to and longitudinally extend along the edge portions of each of the side frames and which has two longitudinal strip portions each formed with a rib projecting inwardly of each strip portion of the molding, wherein each of the clip elements comprises at least one strip portion which is held in abutting engagement with the rib of one of the strip portions of the molding, a limb having a cusped leading end portion which is turned back and which is hitched round the anchor wire along each side end of the head lining, and a flank having at least one lug portion which is held in abutting engagement with the rib of the other of the aforesaid longitudinal strip portions of the side molding, the limb and the flank having elastically pressed therebetween the aforesaid edge portions of each of the side frames of the vehicle body. The flank of each of the clip elements of the suspension-type head lining arrangement above described may further have at least one ledge portion which is held in retaining engagement with the edge portions of each of the side frames along the lower ends of the edge portions.

BRIEF DESCRIPTION OF THE DRAWINGS

The drawbacks of prior-art suspension-type head lining arrangements for the roof structures of automotive vehicles and the features and advantages of a suspension-type head lining arrangement according to the present invention and a clip element to be incorporated into such a head lining arrangement will be more clearly understood from the following description taken in conjunction with the accompanying drawings, in which like reference numerals designate corresponding or similar structures, members and elements throughout the figures and in which.

DETAILED DESCRIPTION OF THE PRIOR ART

Figure 1:
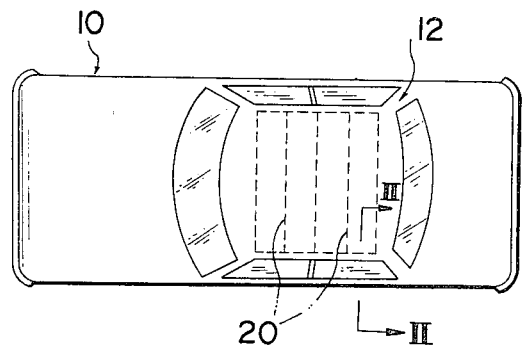
FIG. 1 is a top plan view showing an automotive vehicle provided with a suspension-type head lining arrangement to which the present invention appertains.
Figure 2:
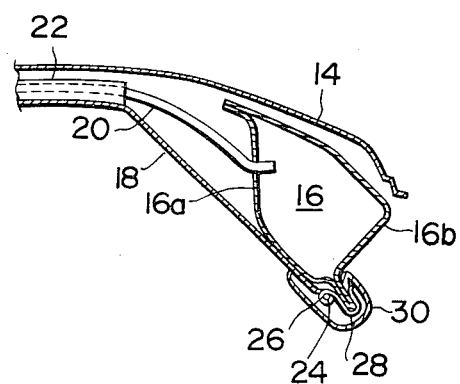
FIG. 2 is a sectional view taken along line II—II in FIG. 1, the sectional view showing a representative example of a prior-art suspension-type head lining arrangement including a wire retaining clip element.
Figure 3:
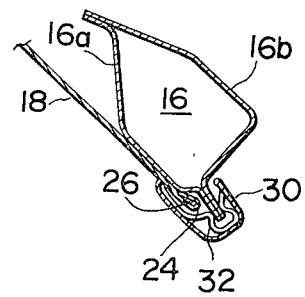
FIG. 3 is a sectional view taken along a line adjacent to the line II—II in FIG. 1, the sectional view of FIG. 3 showing the prior-art suspension head lining arrangement including a molding retaining clip element used in combination with the wire retaining clip element included in the arrangement illustrated in FIG. 2.

Referring of FIGS. 1 to 3 of the drawings, a vehicle body 10 is shown comprising a roof structure 12 including a roof panel 14 and a pair of side frames each of which is shown at 16 in FIGS. 2 and 3. Each of the side frames 16 is positioned internally of and below each side end portion of the roof panel 14 and is welded or otherwise securely connected to a reinforcement member (not shown) attached to the roof panel 14 along each side end of the panel 14. Each side frame 16 is shown comprising respective lower edge portions elongated in a fore-and-aft direction of the vehicle body 10 and welded or otherwise securely held together. The inner and outer members 16a and 16b are further welded or otherwise securely held together along their respective upper edge portions as shown.

A suspended-type head lining arrangement for the roof structure 12 thus constructed comprises a lining 18 suspended and laterally stretched underneath the roof panel 14 by means of a plurality of listing wires 20. The listing wires 20 are arranged at substantially equal spacings from one another in a fore-and-aft direction of the vehicle body 10 and are longitudinally stretched in directions transverse to the fore-and-aft direction of the vehicle body 10 between the right and left side frames 16 as schematically illustrated in FIG. 1. Each of the listing wires 20 is passed through a sleeve 22 formed on the upper face of the head lining 18 and is securely hitched at the opposite ends thereof to the respective inner members 16a of the right and left side frames 16 by high-frequency welding through holes formed in the inner members 16a of the frames 16 as will be seen from FIG. 2. Thus, the head lining 18 has a laterally intermediate portion retained to and laterally stretched by the listing wires 20. Though not illustrated in the drawings, the head lining 18 is fushion-bonded or otherwise securely fastened along the front and rear ends thereof to welts retained to front and rear frames forming part of the roof structure 12.

The head lining 18 has hollow strap portions 24 at and along its right and left side ends located adjacent the lower edge portions of the respective inner and outer members 16a and 16b of the right and left side frames 16. An anchor wire 26 is passed through each of these hollow strap portions 24 of the lining 18 and is conventionally secured to the lower edge portions of the inner and outer members 16a and 16b of each side frame 16 by means of a suitable number of wire retaining clip elements 28 so that the head lining 18 is kept taut in lateral directions of the vehicle body 10 as will be seen from FIG. 2 in which only one of the clip elements 28 is shown. The wire retaining clip elements 28 are arranged at suitable spacings from one another along each of the right and left hollow strap portions 24 of the lining 18 and are held in retaining engagement with the anchor wire in each of the hollow strap portions 24. Each of the clip elements 28 has two tongue portions spaced apart from each other and a rolled end portion merging out of one of the tongue portions. Each of the clip elements 28 is fitted to the side frame 16 in such a manner that the two tongue portions of the clip element have elastically pressed therebetween the lower edge portions of the inner and outer members 16a and 16b of the side frame 16. Furthermore, each clip element 28 has the anchor wire 26 retained thereto in such a manner that the rolled end portion of the clip element 28 is hitched round the anchor wire 26 as will be seen from FIG. 2. The clip elements 28 thus fitted to the side frame 16 and the anchor wire 26 along each side end of the roof structure 12 are enclosed within a side molding 30 retained to the side frame by means of molding retaining clip elements 32 which are located adjacent the wire retaining clip elements 28 and which are also enclosed with in the molding 30 as illustrated in FIG. 3 in which only one of the molding retaining clip elements 32 is shown.

Each of the molding retaining clip elements 32 has a pair of tongue portions spaced apart from each other and two end portions respectively merging out of the tongue portions and warped away from each other. Each of the clip elements 32 thus shaped is fitted to the side frame 16 in such a manner that the tongue portions of the clip element 32 have elastically pressed therebetween the lower edge portions of the inner and outer members 16a and 16b of the side frame 16. Furthermore, the outwardly warped end portions of each clip element 32 are held in elastically pressing contact with inner surface portions of the side molding 32, which is as a consequence retained to the clip elements 32 as will be seen from FIG. 3.

One of the drawbacks inherent in a conventional suspended-type head lining arrangement of the hereinbefore described nature is that a disproportionately large number of meticulous steps are required for asembling the head lining 18 to the side frames 16 of the roof structure 12 by the use of the wire and molding retaining clip elements 28 and 32. This is principally because of the fact that the molding retaining clip elements 32 are formed and arranged separately of the wire retaining clip elements 26 and accordingly that independent steps are required for fitting the clip elements 26 to the side frames 16 and fitting the molding retaining clip elements to the side frames 16 and the side moldings 30. The present invention contemplates elimination of such a drawback of a prior-art suspension-type head lining arrangement for an automotive vehicle as previously noted.

DESCRIPTION OF THE PREFERRED EMBODIMENT

Figure 4:
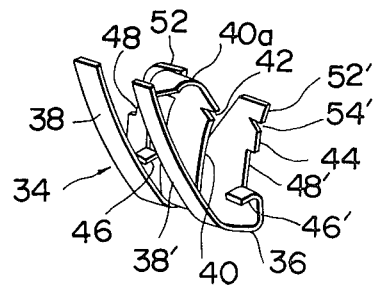
FIG. 4 is a perspective view showing a preferred embodiment of a clip element according to the present invention.

Referring to FIG. 4 of the drawings, a clip element 34 embodying the present invention comprises a laterally elongate, base portion 36, a pair of longitudinally elongate, sides trip portions 38 and 38' projecting substantially in parallel with each other from one elongate end of the base portion 36, and a generally arrow-shaped intermediate limb 40 projecting from the above mentioned elongate end of the base portion 36. The intermediate limb 40 is bent substantially perpendicularly from the base portion 36 and has a cusped leading end portion 42 which is turned back outwardly and which thus form a hook portion of the limb 40. To provide ease of deformation of the cusped leading end portion 40a thus turned back from the remaining portion of the limb 40, the limb 40 may be formed with a pair of V-shaped notches 42 and 42' in its side edge portions intervening between the leading end portion 40a and the remaining portion of the limb 40 as shown. The side strip portions 38 and 38' are bent from the base portion 36 at an angle larger than the angle of bent of the limb 40 with respect to the base portion 36 and are slightly warped outwardly. The intermediate limb 40 is longer than the side strip portions 38 and 38' which have substantially equal lengths.

The clip element 34 further comprises a flank 44 projecting from the other elongate end of the base portion 36 and is bent substantially perpendicularly from the base portion 36 so as to be spaced apart substantially in parallel from the intermediate limb 40. The flank 44 has a pair of side ledge portions 46 and 46' which are bent substantially perpendicularly from the flank 44 toward the side strip portions 38 and 38', respectively. The ledge portions 46 and 46' are cut up from the flank 44, which therefore has formed in its side portions a pair of recesses or cutouts 48 and 48' conforming in shape to the ledge portions 46 and 46', respectively.

The flank 44 is formed with a V-shaped recess or cutout 50 in its end portion opposite to the base portion 36 and thus further has a pair of lug portions 52 and 52' spaced apart from each other across the cutout 50. The lug portions 52 and 52' are bent at a suitable angle from adjacent portions of the flank 44 in directions opposite to the side strip portions 38 and 38', respectively. To provide deformation of the lug portions 52 and 52' thus bent from the adjacent portion of the flank 44, the flank may be formed with a pair of V-shaped notches 54 and 54' in its side edge portions intermediate between the pair of lug portions 52 and 52' and the adjacent portions of the flank 44 as shown. The V-shaped cutout 50 conforms in plan to the cusped leading end portion 40a of the limb 40.

Figure 5:
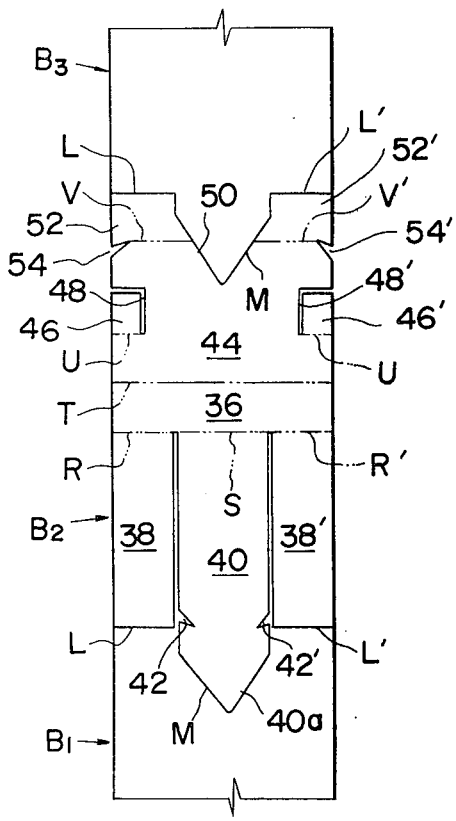
FIG. 5 is a plan view showing a flat blank from which the clip element configured as illustrated in FIG. 4 is to be produced.

The configuration of the clip element 34 thus shaped is suitable for producing such clip elements successively from an elongated strip of metal. FIG. 5 shows a portion of such a strip of metal.

Referring to FIG. 5, the continuous strip of metal is slit along straight lines L and L' and generally V-shaped lines M so that a chain of separate blanks $B_1$, $B_2$, $B_3$ ... are cut off from the strip. The straight lines L and L' define the edges of the side strip portions 38 and 38', respectively, at the leading ends of the strip portions and accordingly the edges of the lug portions 52 and 52', respectively, of the flank 44 at the leading ends of the lug portions. On the other hand, the V-shaped lines M define the edges of the cusped leading end portion 40a of the intermediate limb 40 and accordingly the edges defining the V-shaped cutout 50 in the flank 44. Thus, the blank $B_2$ intermediate between the preceding and succeeding blanks $B_1$ and $B_3$ is separated from the blanks $B_1$ and $B_3$ along the lines L, L' and M. The blank $B_2$ cut off from the continuous strip of metal in this fashion is slit along lines P and P' to separate the side strip portions 38 and 38' and the intermediate limb 40 from each other and along lines Q and Q' to define the side ledge portions 46 and 46' and accordingly the edges defining the cutouts 48 and 48', respectively. The blank $B_2$ is further punched to form the V-shaped notches 42 and 42' in the limb 40 and the V-shaped notches 54 and 53' in the flank 44.

The blank $B_2$ thus obtained is deformed to bend the side strip portions 38 and 38' from the base portion 36 along lines R and R', respectively, the intermediate limb 40 from the base portion 36 along a line S which is aligned with the lines R and R', and the flank 44 from the base portion 36 along a line T which substantially parallel with the lines R, R' and S. Thereupon, the ledge portions 46 and 46' of the flank 44 are bent from the adjacent portions of the flank 44 along lines U and U', respectively, which are substantially aligned with each other and, furthermore, the lug portions 52 and 52' of the flank 44 are likewise bent from the adjacent portions of the flank 44 along lines V and V', respectively, which are substantially aligned with each other and substantially parallel with the lines U and U', respectively. The initially flat blank $B_2$ is thus deformed into the form of the clip element 34 illustrated in FIG. 4.

Figure 6:
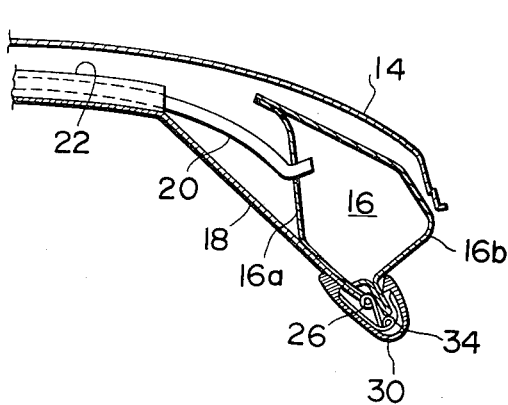
FIG. 6 is a cross sectional view showing part of a suspension-type head lining arrangement having incorporated therein the clip element illustrated in FIG. 4.
Figure 7:
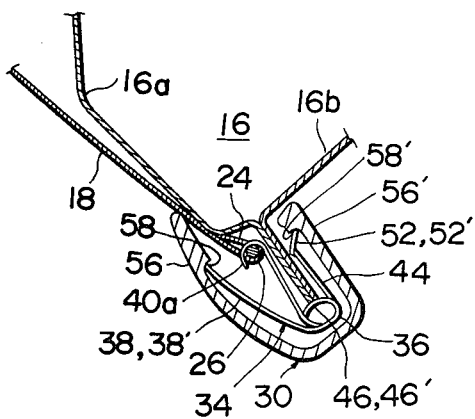
FIG. 7 is a cross sectional view showing to an enlarged scale the suspension-type head lining arrangement illustrated in FIG. 6, the arrangement shown in FIGS. 6 and 7 constituting a preferred embodiment of the present invention.

FIGS. 6 and 7 show a suspension-type head lining arrangement in which the clip element 34 obtained in the above described manner is in use. The head lining arrangement herein shown is per se basically similar to the arrangement previously described with reference to FIGS. 1 to 3 except for the provision of the clip element 34 in lieu of the prior-art clip elements 26 and 28.

In the head lining arrangement illustrated in FIGS. 6 and 7, the clip element 34 is fitted to the welded or otherwise combined edge portions of the inner and outer members 16a and 16b of the side frame 16 by the aid of the side molding 30 in such a manner that the intermediate limb 40 and the flank 44 have clamped therebetween the edge portions of the members 16a and 16b. The molding 30 has a generally U-shaped cross section and, thus, has two longitudinal strip portions 56 and 56' which are spaced apart substantially in parallel from each other, as will be better seen from FIG. 7. The strip portions 56 and 56' of the molding 30 are formed with ribs 58 and 58', respectively, which are located adjacent the respective edges of the strip portions and which laterally project inwardly of the strip portions. The side strip portions 38 and 38' of the clip element 34 are held in abutting engagement at their respective leading ends with the rib 58 of one strip portion 56 of the molding 30 and, likewise, the lug portions 52 and 52' of the flank 44 of the clip element 34 are held in abutting engagement at their respective leading ends with the rib 58' of the other strip portion 56' of the molding 30.

Furthermore, the cusped and turned leading end portion 40a of the intermediate limb 40 pierces through the hollow strap portion 24 of the head lining 18 and is hitched round the anchor wire 26 wrapped in the strap portion 24 so that the head lining 18 is secured along its side end to the side molding 30 by means of the anchor wire 26 and the clip element 34. On the other hand, the ledge portions 46 and 46' forming part of the flank 44 of the clip element 34 are held in engagement with the edge portions of the inner and outer members 16a and 16b of the side frame 16 at the lower ends of the edge portions. The molding 30 in thus retained to the side frame 16 not only by the limb 40 and the lug portions 52 and 52' of the clip element 34 but the ledge portions 46 and 46' of the clip element 34.

While the clip element 34 hereinbefore described is adapted to have the edge portions of the inner and outer members 16a and 16b of the side frame 16 clamped between the back of the turned leading edge portions 40a of the intermediate limb 40 and the bent edges of the lug portions 52 and 52' thereof, the clip element 34 may be modified so that the edge portions of the members 16a and 16b are clamped between an intermediate portion of the limb 40 and a longitudinally intermediate portion of the flank 44. As an alternative, the clip element 34 may be modified so that the limb 40 and the flank 44 thereof have corrugated portions adapted to have clamped therebetween the edge portions of the inner and outer members 16a and 16b of the side frame 16.

As will be appreciated from the foregoing description, the clip element provided by the present invention is adapted to retain the side molding 30 to the side frame 16 and retain the head lining 18 to the molding 30 and is, thus, useful for achieving the respective functions of both of the wire retaining clip 26 (FIG. 2) and the molding retaining clip (FIG. 3) in a prior-art suspension-type head lining arrangement.

What is claimed is:

1. A suspension-type head lining arrangement for the roof structure of an automotive vehicle having a vehicle body including a pair of side frames each having lower edge portions which are secured together and which extend along each side end of the roof structure, comprising:
    a clip element including
        a laterally elongated base portion;
        at least one strip portion bent from the base portion along one elongate end of the base portion;
        a limb bent from the base portion along said elongate end of the base portion and having a cusped leading end portion which is turned back outwardly; and
        a flank bent from said base portion along the opposite elongate end of the base portion and having at least one lug portion which is outwardly bent from an adjacent portion of the flank.

2. A suspension-type head lining arrangement as set forth in claim 1, wherein said flank of said clip element further has at least one ledge portion which is inwardly bent from an adjacent portion of the flank.

3. A suspension-type head lining arrangement as set forth in claim 1 or 2, wherein said limb of said clip element is formed with a pair of notches in its opposite side edge portions adjacent to said suspended leading end portion.

4. A suspension-type head lining arrangement as set forth in claim 1 or 2, wherein said flank of said clip element is formed with a notch in its side edge portion adjacent said lug portion.

5. A suspension-type head lining arrangement for the roof structure of an automotive vehicle having a vehicle body including a pair of side frames each having lower edge portions which are secured together and which extend along each side end of the roof structure, comprising
    a clip element including
        a laterally elongated base portion;
        a pair of side strip portions which are bent from said base portion along one elongated end of the base portion and which extend substantially in parallel with each other;
        an intermediate limb laterally intervening between said strip portions and bent from said base portion along said elongate end of the base portion, said limb having a cusped leading end portion which is turned back outwardly; and
        a flank bent from said base portion along the opposite end of the base portion and having a pair of lug portions which are outwardly bent from adjacent portions of the flank.

6. A suspension-type head lining arrangement as set forth in claim 5, wherein said flank of said clip element further has a pair of ledge portions which are inwardly bent from adjacent portions of the flank.

7. A suspension-type head lining arrangement as set forth in claim 5 or 6, wherein said flank of said clip element is formed with a recess across which said lug portions are spaced apart from each other.

8. A suspension-type head lining arrangement as set forth in claim 7, wherein said cusped leading end portion of said limb of said clip element conforms in plan to said recess.

9. A suspension-type head lining arrangement as set forth in claim 8, wherein said limb of said clip element is longer in plan that said strip portions.

10. A suspension-type head lining arrangement as set forth in claim 5 or 6, wherein said limb of said clip element is formed with a pair of notches in its side edge portions adjacent to said cusped leading end portion.

11. A suspension-type head lining arrangement as set forth in claim 5 or 6, wherein said flank of said clip element is formed with a pair of notches in its side edge portions adjacent said lug portions, respectively.

12. A suspension-type head lining arrangement as set forth in claim 1, 2, 5 or 6, wherein at least one of said limb and said flank of said clip element has a corrugated longitudinally intermediate portion.

13. A suspension-type head lining arrangement for the roof structure of an automotive vehicle having a vehicle body including a pair of side frames each having lower edge portions which are secured together and which extend along each side end of the roof structure, comprising
    a plurality of listing wires stretched between said side frames and spaced apart substantially in parallel with each other in a fore-and-aft direction of the vehicle body, a head lining having a laterally intermediate portion retained to said listing wires, a pair of anchor wires retained to said head lining along the side ends, respectively, of said head lining, a plurality of clip elements fitted to said edge portions of each of said side frames, and a side molding fitted to and longitudinally extending along said edge portions of each of said side frames and having two longitudinal strip portions each formed with a rib projecting inwardly of each strip portion, each of said clip elements comprising at least one strip portion which free end is held in abutting engagement with the rib of one of said strip portions of the side molding, a limb having a cusped leading end portion which is turned back and which is hitched round said anchor wire, and a flank having at least one lug portion which free end is held in abutting engagement with the rib of the other of said strip portions of said side molding, said limb and said flank having elastically pressed therebetween said edge portions of said side frame.

14. A suspension-type head lining arrangement as set forth in claim 13, in which the flank of each of said clip elements further has at least one ledge portion which is held in retaining engagement with said edge portions of said side frame along the lower ends of the portions.

15. A suspension-type head lining arrangement as set forth in claim 13 or 14, in which each of said clip elements further comprises a base portion elongated in a fore-and-aft direction of the vehicle body and in which said strip portion and limb of the clip element are bent from said base portion along one elongate end of the base portion and said flank is bent from the base portion along the other elongate end of the base portion.

16. A suspension-type head lining arrangement as set forth in claim 15, in which said cusped leading end portion of said limb is turned back outwardly of the limb.

17. A suspension-type head lining arrangement as set forth in claim 16, in which said lug portion is bent from said flank outwardly of the flank.

18. A suspension-type head lining arrangement as set forth in claim 17, in which said edge portions of said side frame are clamped between the back of the turned leading end portion of said limb and the bent edge of said lug portion.

19. A suspension-type head lining arrangement as set forth in claim 17, in which said edge portions of said side frame are clamped between an intermediate portion of the limb and an intermediate portion of said flank.

20. A suspension-type head lining arrangement as set forth in claim 17, in which said limb and said flank have corrugated portions and have said edge portions of said side frame clamped between said corrugated portions.

21. A suspension-type head lining arrangement as set forth in any one of claims 16 to 20, in which said limb is formed with a pair of notches in its side edge portion adjacent to said cusped leading end portion of the limb.

22. A suspension-type head lining arrangement as set forth in any one of claims 16 to 20, in which said flank is formed with a notch in its side edge portion adjacent said lug portion.

* * * * *